United States Patent [19]

Schaffernicht et al.

[11] 4,047,915
[45] Sept. 13, 1977

[54] METHOD OF MANUFACTURING GLASS VACUUM ENVELOPES

[75] Inventors: Klaus Schaffernicht, Herrlingen; Josef Hentrich, Ulm, Donau; Herbert Klein, Ulm, Donau; Karl-Heinz Kuckenburg, Ulm, Donau, all of Germany

[73] Assignee: Licentia Patent-Verwaltungs-G.m.b.H., Frankfurt am Main, Germany

[21] Appl. No.: 698,818

[22] Filed: June 23, 1976

[30] Foreign Application Priority Data

June 26, 1975 Germany ............................ 2528421

[51] Int. Cl.² .......................................... C03B 23/02
[52] U.S. Cl. ........................................ 65/106; 65/67; 65/273; 65/291

[58] Field of Search ................. 65/105, 106, 273, 185, 65/184, 107, 291, 67

[56] References Cited

U.S. PATENT DOCUMENTS 3,484,225  12/1969  Bognar ............................. 65/105 X
3,582,304   6/1971  Bognar ............................. 65/105

Primary Examiner—Arthur D. Kellogg
Attorney, Agent, or Firm—Spencer & Kaye

[57] ABSTRACT

A method of manufacturing a vacuum envelope comprises heating a glass plate clamped at at least several points around its periphery and, when the glass begins to soften, pressing a stamp against the glass to deform it, the deformed glass then having its rim, formed by the clamping, removed.

15 Claims, 6 Drawing Figures

METHOD OF MANUFACTURING GLASS VACUUM ENVELOPES

BACKGROUND OF THE INVENTION

The present invention relates to a method of manufacturing vacuum envelopes or vacuum envelope parts made of glass for electronic valves, particularly for cathode ray tubes, in which a substantially flat plate of glass is heated beyond the softening point and is deformed by means of an appropriately moulded stamp.

It is known to produce bulbs for electronic valves by means of glass blowing and appropriate further processing of the moulded glass body. Larger valves, particularly cathode ray tubes, such as image tubes and oscillograph tubes are normally manufactured so that the vacuum casing is composed of several individual moulded glass parts. A typical cathode ray tube bulb comprises a so-called valve neck, a so-called valve cone which is also the funnel-shaped part of the valve, and a front plate on the inner surface of which is arranged a fluorescent screen. In the same way, it is known to use a front dish which has a rim on its periphery instead of a plane-parallel front plate. The facing annular surfaces of the individual parts, which must of course be largely the same at their periphery, are then fused together or are connected together in vacuum-tight manner with the aid of a soldering material, e.g. a glass solder. Then, at a later point in time, the so-called valve stem is inserted in vacuum-tight manner into the free opening of the valve neck, the electron-producing system being mounted generally on the valve stem.

The cone and the front dish may, as is known, have quite considerable dimensions. They are manufactured in known manner in machines from a supply of glass by means of pressing, spinning or blowing. These known production methods require very expensive devices as well as voluminous devices used in glass technology, and this is particularly true for the manufacture of the valve cone.

SUMMARY OF THE INVENTION

It is an object of the present invention to manufacture valve envelopes, such as those of the type stated at the outset with relatively simple devices requiring extremely little expense, particularly with respect to the work of preparing the raw material glass.

According to a first aspect of the invention, there is provided a method of manufacturing glass vacuum envelopes comprising the steps of clamping a glass plate at at least several points about its periphery in clamping means, heating said glass plate, pressing a stamp against said glass plate when said glass plate begins to soften, moving said stamp in the pressing direction to deform said glass plate, releasing said deformed glass plate from said clamping means and removing the part of said glass plate previously held in said clamping means.

According to a second aspect of the invention, there is provided a method of manufacturing vacuum casings or vacuum casing parts made of glass for electronic valves, particularly cathode ray tubes, in which a substantially plane glass plate is heated beyond the softening point and is deformed by means of an appropriately moulded stamp, characterised in that said glass plate is clamped at the circumference at least at several points; that the free part of said glass plate is heated; that when said glass plate begins to soften, said stamp is pressed against said glass plate perpendicular to the plane of extension of said glass plate; that said stamp is moved on in the pressing direction relative to said clamping points with further supply of heat at the same time, wherein the glass of said glass plate substantially abuts the end surface and the side surfaces of said stamp while at the same time the thickness of said glass becomes thinner and that after at least partial cooling of the moulded glass body has taken place, and after removal of said stamp and release of the clamping points, at least the edge which has been formed by clamping is removed.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
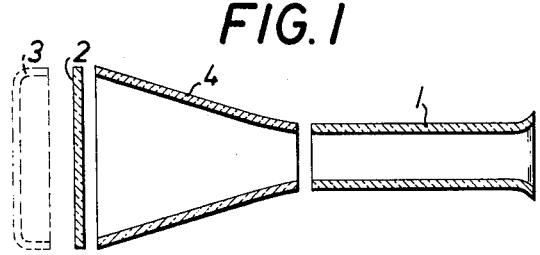
FIG. 1 shows a cathode ray tube envelope of known form.

FIG. 1 shows the construction of a known cathode ray tube envelope which is to be used to illustrate the inventive method.

In FIG. 1, the individual parts of the envelope are shown schematically in their positions. The cathode ray tube bulb according to FIG. 1 comprises the so-called neck 1 of the valve, the so-called valve cone 4, which is also designated as the funnel-shaped part of the valve, and the front plate 2, on the inner surface of which is arranged the fluorescent screen. It is also possible to use a cup-shaped front dish 3 which has a rim on its periphery instead of a plane-parallel front plate 2. The facing annular surfaces of the individual parts, which must of course be largely the same at their periphery, are then fused together or are connected together in vacuum-tight manner with the aid of a soldering material, e.g. a glass solder. Then, at a later point in time, the so-called valve stem is inserted in vacuum-tight manner into the free opening of the valve neck 1, the electron-producing system being mounted generally on the valve stem.

The cone 4 and the front dish 3, may, as is known, have quite considerable dimensions. They have previously been manufactured in known manner from a supply of glass in machines by means of pressing, spinning or blowing. These known production methods require very expensive devices as well as voluminous devices used in glass technology, and this is particularly true for the manufacture of the valve cone 4.

In a preferred embodiment of the present invention, to form a valve bulb of the type shown in FIG. 1, a glass plate is clamped at least at several points on its circumference; the free part of the glass plate is heated; when the glass plate begins to soften the stamp is pressed against it, perpendicular to the plane over which the glass plate extends; the stamp is moved on-wards in the direction of pressure relative to the clamping points with simultaneous further supply of heat, wherein the glass of the glass plate substantially abuts the end surface and the side surfaces of the stamp while at the same time the thickness of the glass becomes thinner; and after at least partial cooling of the moulded glass body has taken place, after removal of the stamp and release of the clamping points, at least the rim which has been formed by clamping is removed.

A substantial advantage of this is seen in that it is possible, with the aid of the method described, to manufacture with simple devices relatively complicated valve parts, such as, a valve cone with a rectangular periphery. A further advantage comprises that the raw material glass may be processed on a device in accordance with the invention in a cheap and commercial mould without very great preparation. Among other advantages it is also worth mentioning that in a simple manner, the method described offers the possibility of producing varying wall thicknesses which are matched to the later required loading of the valve bulb under vacuum pressure.

Figure 2:
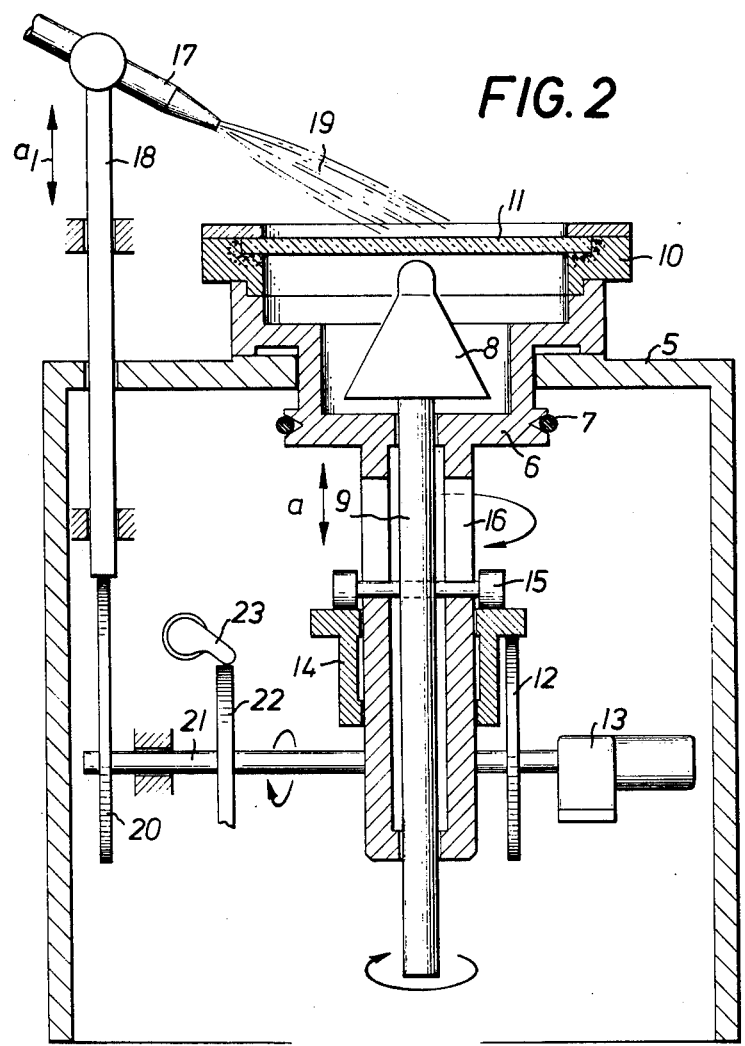
FIG. 2 shows, schematically, a sectional elevation of a device for providing parts of a cathode ray tube in accordance with the invention.

In FIG. 2, a device in accordance with the invention for carrying out the method in accordance with the invention is shown schematically. This device is suited both for manufacturing front dishes and also valve funnels (cones) of cathode ray tubes according to the invention. The device is shown only in outline for the purpose of clearer explanation of the mode of operation.

A pipe-like casing 6 having regions of varying diameter is rotatably mounted on a fixed table support 5. This pipelike casing is set in rotation about its longitudinal axis e.g. at approximately 90 revolutions/min, by suitable means, e.g. with the aid of the illustrated cord drive 7. A stamp 8 is located on the longitudinal axis of this casing 6. In the example of embodiment shown, the outer shape of this stamp 8 corresponds approximately to the shape of the inner wall of the valve funnel to be manufactured. This means that the periphery of this stamp may be circular or rectangular or have any other desired cross-section. The lower part has a rectangular periphery for valves with rectangular fluorescent screen, while the upper part has a substantially circular periphery, as in such a valve the valve cone forms the transition region between the rectangular fluorescent screen and the circular valve neck. This stamp 8 may be moved up and down within the casing 6 in the direction of the double arrow $a$ with the aid of a slide rod 9.

Furthermore, a removable lining 10 is located on the casing 6 and serves as a clamping device for the glass plate 11 used as starting material. It is advisable for clamping of the glass plate 11 to take place in the clamping device 10 at the periphery of the glass plate so that poor heat transfer between the glass plate and the clamping device 10 is achieved. The clamping device may, for example, have asbestos material and/or carbon parts for this purpose on the surfaces of contact with the glass plate 11.

The upward and downward movement of the stamp 8 in the direction of the double arrow $a$ is preferably controlled, by means of an exchangeable cam disc 12, at an even or uneven speed. This cam disc 12 is controlled by a variable speed geared motor 13. The curved disc 12 acts via an intermediate part 14 on a small travelling wheel 15, the axis of which is rigidly connected to the guide bar 9. According to the position of the curved disc 12, the guide bar 9 is moved vertically with the stamp 8. The pipe-like casing member 6 has two slit-shaped openings 16 for this purpose, within which the axis of the travelling wheels 15 may move up and down without hindering the uniform rotary movement of the guide bar 9 and the casing 6.

Furthermore, one or more burners 17 are fixed to the table support 5, e.g. to guide bars 18. The burners are so arranged that their flames 19 are directed on to the glass plate 11 and heat the latter to the desired processing temperature. It will generally be advisable for these burners to move vertically during the deformation process, i.e. in the direction of the double arrow $a_1$. The burner or burners 17 may be controlled to take up a position which is the most favourable for the respective momentary intermediate state of deformation. This control may also take place, for example, via an exchangeable cam disc 20 and it is advisable to arrange this on the same shaft 21 with the curved cam disc 12.

One or more valves 23 may be controlled by a further cam disc 22 arranged on the shaft 21 such that the related flames 19 of the burners 17 are set to optimum heat emission for the respective intermediate state of deformation. As a result of the fact that the cam discs 12, 20 and 22 are arranged on one and the same shaft 21, a synchronous operation of the control processes may be assured.

As already stated above, the clamping device 10 is formed so that the glass plate 11 has as little as possible direct contact with the metal parts, but is insulated from the metal parts of the clamping device 10 by means of holding elements, e.g. made of carbon or asbestos.

Furthermore, it may be advisable to connect the clamping device 10 to a pump, which makes it possible to produce an under or overpressure at least occasionally in the chamber below the glass plate 11, whereby the deformation processes of the glass plate 11 may be additionally influenced.

The use of a simple removable clamping device 10 is advantageous inasmuch as a plurality of these clamping devices may be provided which are already provided with glass plates 11 and which are already preheated in a furnace so that the actual device may operate continuously and the clamping device 10 is exchanged after each operating process.

Figure 3:
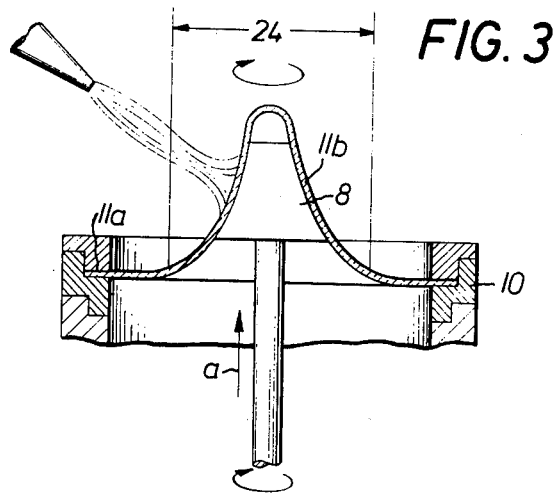
FIG. 3 is a partial view of the device of FIG. 2 showing the deformation of a glass plate during the production of a cathode ray tube envelope part in accordance with the invention.

In FIG. 3, the actual deformation process is shown schematically, only a part of the apparatus being shown. The glass plate 11 mounted in the clamping device 10 is heated prior to its deformation by the movement of the stamp 8 in the direction of the arrow $a$ to form a raw cone 11b. The edge of the glass plate 11 is designated 11a and is located in the clamping device 10. As a result of choosing the processing conditions, i.e. as a result of appropriate adjustment of the feed speed of the stamp 8 and as a result of adjustment of the degree of softening of the glass as well as the position and strength of the heating flame, the wall thickness may follow, for example, a path as shown in FIG. 1. It is in fact advisable to make the wall strength of the cone smaller at the end near the neck pipe than at the end near the front plate. This gives better matching of the atmosphere to the later pressure loads, which are greater at the picture screen end of the cone than at the neck end.

Figure 4:
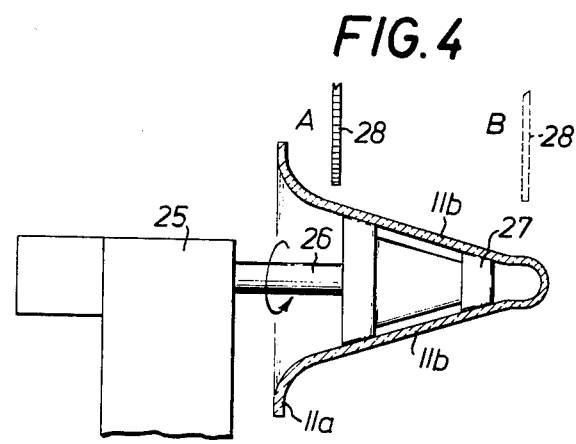
FIG. 4 is a view showing a further stage in the method.

In FIG. 4, it is shown how the raw cone 11b is brought into its final shape and length. It is advisable to use a glass cutting machine for this purpose. A bearing block 25 is fixed on to the latter and a rotatable shaft 26 is mounted in the bearing block 25 and is provided with a suitable mounting, e.g. a vacuum mounting 27. The conical blank 11b is taken up by the vacuum mounting 27 and is cut off to the right length in the plane A by means of a saw blade 28. The shaft 26 must be rotated together with the mounting 27 for this purpose.

Then the machine table or the saw blade 28 is displaced until the saw blade 28 comes to rest in position B and here severs the dome. Thereafter, the finished valve cone provided with the connecting surfaces may be removed from the device.

Figure 5:
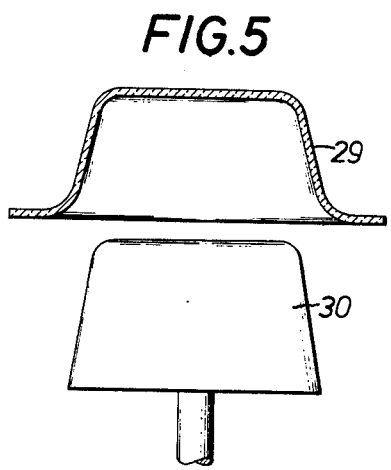
FIG. 5 shows schematically the production of an end plate.

FIG. 5 shows schematically the manufacture of the front dish of a cathode ray tube designated 3 in FIG. 1. Here, the stamp of the deformation device has the shape designated 30. With this stamp the raw front dish 29 is moulded from a glass plate in the same manner as was described in conjunction with the manufacture of a valve cone. The raw front dish 29 in turn has a rim pointing outwards, which has been created by clamping in the clamping device 10.

Figure 6:
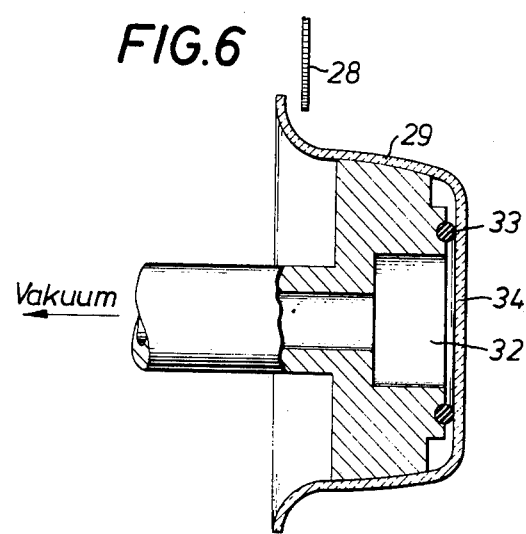
FIG. 6 shows schematically a further step in the production of the end plate.

This raw front dish 29 is now, shown as in FIG. 6, accommodated by a vacuum mounting 31. The vacuum mounting 31 is constructed so that the vacuum chamber 32, having the sealing ring 33, acts on the plane surface 34 of the front dish. With the aid of a saw blade 28, the rim which has been formed by clamping of the glass plate is sawn off and the desired flat front dish having a rim and sealing surface for connecting to the valve cone 4 is obtained as shown in FIG. 1.

It will be understood that the above description of the present invention is susceptible to various modification changes and adaptations.

What is claimed is:
1. A method of manufacturing vacuum casings or vacuum casing parts made of glass for electronic valves, particularly cathode ray tubes, in which a substantially plane glass plate is heated beyond the softening point and is deformed by means of an appropriately moulded stamp, characterised in that said glass plate is clamped at the circumference at least at several points; that the free part of said glass plate is heated; that when said glass plate begins to soften, said stamp is pressed against said glass plate perpendicular to the plane of extension of said glass plate; that said stamp is moved on in the pressing direction relative to said clamping points with further supply of heat at the same time, wherein the glass of said plate substantially abuts the end surface and the side surfaces of said stamp while at the same time the thickness of said glass becomes thinner; and that after at least partial cooling of the moulded glass body has taken place, and after removal of said stamp and release of the clamping points, at least the edge which has been formed by clamping is removed.

2. A method as defined in claim 1, wherein said stamp is also heated before contact with said glass plate.

3. A method as defined in claim 1, and comprising carrying out a relative rotary movement between a heating source providing said heating of said glass plate on the one hand and said clamping device and said stamp on the other hand.

4. A method as defined in claim 1 comprising moving a heating source used to heat said glass plate in the same direction as and depending on the movement of said stamp and/or changing said heating source relative to its effective surface.

5. A method as defined in claim 1 and comprising heating said glass plate to deform the glass of said glass plate plastically without its becoming soft and liquid.

6. A method as defined in claim 1 and comprising regulating the speed of movement of said stamp in the pressure direction in dependence on the degree of softening of the glass.

7. A method as defined in claim 1 for producing a funnel part of a cathode ray tube and further comprising providing the moulded glass blank with annular connection surfaces at both ends by removing a rim formed by the clamping and a dome formed by an end surface of said stamp, these to serve as connection surfaces for connection with further vacuum envelope parts.

8. A method as defined in claim 1 for producing a front plate part of a cathode ray tube which has a rim further comprising constructing an end surface of said stamp to largely retain the plane-parallelism of the glass plate in this region and providing the rim with an annular connection surface by removal of a rim formed by the clamping, to serve as a connection surface for connection to a further vacuum envelope part.

9. A method as defined in claim 1 and comprising clamping said glass plate substantially horizontally and moving said stamp perpendicularly thereto in an upward direction from below.

10. A method as defined in claim 1 and comprising clamping said glass plate substantially vertically and moving said stamp in a substantially horizontal direction while simultaneously and synchronously rotating both a clamping device carrying out said clamping of said glass plate and said stamp about the longitudinal axis of said stamp.

11. A method as defined in claim 1 and comprising creating varying atmospheric pressure conditions during the deformation process at least occasionally on both sides of said glass plate.

12. A method as defined in claim 1, and comprising softening the glass plate with flame burners.

13. A method as defined in claim 1, and comprising regulating the heat emission of the heating sources used to heat said glass plate in dependence on the deformation process.

14. A method as defined in claim 1 and comprising first of all heating said glass plate together with an exchangeable clamping device in a furnace and then arranging these preheated parts on the deformation device for deformation to then take place.

15. A method of manufacturing glass vacuum envelopes comprising the steps of clamping a glass plate at at least several points about its periphery in clamping means, heating said glass plate, pressing a stamp against said glass plate when said glass plate begins to soften, moving said stamp in the pressing direction to deform said glass plate, releasing said deformed glass plate from said clamping means and removing the part of said glass plate previously held in said clamping means.

* * * * *